(12) United States Patent
Boss et al.

(10) Patent No.: US 10,904,615 B2
(45) Date of Patent: Jan. 26, 2021

(54) ACCESSING AND ANALYZING DATA TO SELECT AN OPTIMAL LINE-OF-SIGHT AND DETERMINE HOW MEDIA CONTENT IS DISTRIBUTED AND DISPLAYED

(71) Applicant: INTERNATIONAL BUSINESS MACHINES CORPORATION, Armonk, NY (US)

(72) Inventors: Gregory J. Boss, Saginaw, MI (US); Brent Hodges, Raleigh, NC (US); John E. Moore, Jr., Pflugerville, TX (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/697,567

(22) Filed: Sep. 7, 2017

(65) Prior Publication Data
US 2019/0075359 A1 Mar. 7, 2019

(51) Int. Cl.
*H04N 21/45* (2011.01)
*H04N 21/41* (2011.01)
*H04L 29/08* (2006.01)
*G06Q 30/02* (2012.01)

(52) U.S. Cl.
CPC ..... *H04N 21/4532* (2013.01); *G06Q 30/0261* (2013.01); *H04L 67/306* (2013.01); *H04N 21/4104* (2013.01)

(58) Field of Classification Search
None
See application file for complete search history.

(56) References Cited

U.S. PATENT DOCUMENTS

| | | | | |
|---|---|---|---|---|
| 6,756,997 | B1* | 6/2004 | Ward | G06Q 30/0269 |
| | | | | 348/E5.104 |
| 7,383,509 | B2* | 6/2008 | Foote | G09B 5/00 |
| | | | | 704/E15.045 |
| 8,250,601 | B2* | 8/2012 | King | G08C 17/02 |
| | | | | 725/37 |
| 8,307,395 | B2* | 11/2012 | Issa | G06Q 10/10 |
| | | | | 725/46 |
| 8,456,293 | B1* | 6/2013 | Trundle | G08B 21/0423 |
| | | | | 340/517 |
| 8,694,495 | B2* | 4/2014 | Saito | G06Q 30/02 |
| | | | | 707/732 |
| 9,088,757 | B2* | 7/2015 | Curtis | H04N 5/76 |
| 9,288,387 | B1* | 3/2016 | Keller | H04N 21/44218 |
| 9,538,219 | B2* | 1/2017 | Sakata | H04N 17/04 |
| 9,667,584 | B2* | 5/2017 | Archibong | H04L 65/403 |
| 9,866,916 | B1* | 1/2018 | Boss | H04N 21/4852 |

(Continued)

*Primary Examiner* — An Son P Huynh
(74) *Attorney, Agent, or Firm* — Cantor Colburn LLP; Samuel Waldbaum (57) ABSTRACT

Embodiments of the invention include methods and systems for selecting an optimal line-of-sight for a user in a multiple display screen venue. Aspects of the invention include receiving, by a processor, an indication that the user is visiting the multiple display screen venue. A user profile including one or more preferences for the user is access based at least in part on the indication of the user. Properties for one or more locations in the venue are received and a set of locations from the one or more locations is determined that satisfy the one or more preferences of the user.

12 Claims, 7 Drawing Sheets

(56) References Cited

U.S. PATENT DOCUMENTS

| | | | |
|---|---|---|---|
| 2002/0046100 A1* | 4/2002 | Kinjo | G06F 3/011 705/14.66 |
| 2002/0073417 A1* | 6/2002 | Kondo | H04N 7/002 725/10 |
| 2003/0093200 A1* | 5/2003 | Gutta | G08B 13/19602 701/45 |
| 2004/0001616 A1* | 1/2004 | Gutta | G06Q 30/02 382/118 |
| 2005/0289582 A1* | 12/2005 | Tavares | G06K 9/00221 725/10 |
| 2006/0204058 A1* | 9/2006 | Kim | G06K 9/00288 382/118 |
| 2007/0104369 A1* | 5/2007 | Weatherhead | H04H 60/45 382/181 |
| 2008/0036875 A1* | 2/2008 | Jones | H04N 5/23238 348/222.1 |
| 2008/0092156 A1* | 4/2008 | Ferrone | H04H 60/33 725/13 |
| 2009/0027337 A1* | 1/2009 | Hildreth | G06F 3/011 345/158 |
| 2009/0030800 A1* | 1/2009 | Grois | G06Q 30/0277 705/14.52 |
| 2009/0131764 A1* | 5/2009 | Lee et al. | A61B 5/0205 600/301 |
| 2009/0133051 A1* | 5/2009 | Hildreth | H04N 5/4403 725/28 |
| 2009/0138805 A1* | 5/2009 | Hildreth | G06K 9/00335 715/745 |
| 2009/0273711 A1* | 11/2009 | Chapdelaine | G06K 9/00711 348/465 |
| 2010/0205541 A1* | 8/2010 | Rapaport | G06Q 10/10 715/753 |
| 2010/0207874 A1* | 8/2010 | Yuxin | G06F 3/017 345/156 |
| 2010/0211439 A1* | 8/2010 | Marci | G06Q 10/10 705/7.29 |
| 2011/0008019 A1* | 1/2011 | Hirano | H04N 5/782 386/296 |
| 2011/0050656 A1* | 3/2011 | Sakata | G06F 3/011 345/204 |
| 2011/0069940 A1* | 3/2011 | Shimy | G11B 27/105 386/296 |
| 2011/0072452 A1* | 3/2011 | Shimy | H04N 7/163 725/25 |
| 2011/0078731 A1* | 3/2011 | Nishimura | G06F 9/453 725/39 |
| 2011/0112890 A1* | 5/2011 | Chu | G06Q 30/02 705/7.33 |
| 2011/0115887 A1* | 5/2011 | Yoo | G06F 3/017 348/51 |
| 2011/0185437 A1* | 7/2011 | Tran | H04L 63/104 726/28 |
| 2011/0237324 A1* | 9/2011 | Clavin | G06K 9/00369 463/29 |
| 2011/0295693 A1* | 12/2011 | Clavin | G06Q 30/0269 705/14.66 |
| 2011/0314507 A1* | 12/2011 | Keen | H04N 7/18 725/77 |
| 2012/0030637 A1* | 2/2012 | Dey | G06F 3/017 715/863 |
| 2012/0060176 A1* | 3/2012 | Chai | H04H 60/45 725/10 |
| 2012/0154557 A1* | 6/2012 | Perez | H04N 21/25891 348/53 |
| 2012/0208466 A1* | 8/2012 | Park | G06F 1/1601 455/41.3 |
| 2013/0027613 A1* | 1/2013 | Kim | H04N 21/4126 348/563 |
| 2013/0036200 A1* | 2/2013 | Roberts | H04L 65/4076 709/219 |
| 2013/0067513 A1* | 3/2013 | Takami | G06Q 30/02 725/34 |
| 2013/0076853 A1* | 3/2013 | Diao | H04N 7/157 348/14.08 |
| 2013/0086602 A1* | 4/2013 | Mikan | H04L 67/24 725/10 |
| 2013/0173765 A1* | 7/2013 | Korbecki | H04N 21/42209 709/221 |
| 2013/0194177 A1* | 8/2013 | Sakata | H04N 21/4223 345/156 |
| 2013/0205314 A1* | 8/2013 | Ramaswamy | H04N 21/44213 725/14 |
| 2013/0219417 A1* | 8/2013 | Gilson | H04N 21/258 725/12 |
| 2013/0232515 A1* | 9/2013 | Rivera | H04N 21/44213 725/12 |
| 2013/0298146 A1* | 11/2013 | Conrad | H04N 21/252 725/12 |
| 2014/0067828 A1* | 3/2014 | Archibong | H04L 65/4084 707/748 |
| 2014/0078039 A1* | 3/2014 | Woods | H04N 21/4223 345/156 |
| 2014/0089017 A1* | 3/2014 | Klappert | G06Q 10/02 705/5 |
| 2015/0012362 A1* | 1/2015 | Coon | G06Q 30/0269 705/14.66 |
| 2015/0033266 A1* | 1/2015 | Klappert | G06F 3/015 725/52 |
| 2015/0110471 A1* | 4/2015 | Zheng | H04N 5/76 386/291 |
| 2015/0138044 A1* | 5/2015 | Rawlinson | G06F 3/1454 345/2.2 |
| 2015/0244747 A1* | 8/2015 | Wickenkamp | H04L 65/403 726/28 |
| 2015/0264299 A1* | 9/2015 | Leech | H04N 7/0117 348/78 |
| 2016/0021412 A1* | 1/2016 | Zito, Jr. | H04N 21/251 725/13 |
| 2016/0057497 A1* | 2/2016 | Kim | H04N 21/44218 725/10 |
| 2016/0134938 A1* | 5/2016 | Miyazaki | H04N 7/142 348/14.07 |
| 2016/0182930 A1 | 6/2016 | Ortiz et al. | |
| 2016/0205429 A1 | 7/2016 | Ortiz et al. | |
| 2016/0212465 A1* | 7/2016 | Kim | H04N 21/4667 |
| 2016/0311323 A1* | 10/2016 | Lee | B60K 35/00 |
| 2016/0345044 A1* | 11/2016 | Klappert | H04N 21/41415 |
| 2016/0345062 A1* | 11/2016 | Klappert | H04N 21/4667 |
| 2016/0373522 A1* | 12/2016 | Carlos | G06Q 10/10 |
| 2017/0091850 A1* | 3/2017 | Alvarez | H04W 4/30 |
| 2017/0097677 A1* | 4/2017 | McLean | G06F 3/013 |
| 2017/0099455 A1* | 4/2017 | Mazzarella | H04W 4/90 |
| 2017/0212583 A1* | 7/2017 | Krasadakis | G06F 3/013 |
| 2017/0264920 A1* | 9/2017 | Mickelsen | G06K 9/00335 |
| 2017/0289596 A1* | 10/2017 | Krasadakis | H04N 21/25883 |
| 2017/0315612 A1* | 11/2017 | Shanware | G06F 3/013 |
| 2018/0040324 A1* | 2/2018 | Wilberding | G10L 17/22 |
| 2018/0063263 A1* | 3/2018 | Bandela | H04L 67/22 |
| 2018/0081432 A1* | 3/2018 | Chen | G06F 3/013 |
| 2018/0146240 A1* | 5/2018 | Gratton | H04N 21/43615 |

* cited by examiner

ACCESSING AND ANALYZING DATA TO SELECT AN OPTIMAL LINE-OF-SIGHT AND DETERMINE HOW MEDIA CONTENT IS DISTRIBUTED AND DISPLAYED

BACKGROUND

The present invention generally relates to lines-of-sight for viewing displayed media content, and more specifically, to methods, systems and computer program products for accessing and analyzing data to select an optimal line-of-sight for viewing displayed media content, as well as determining how media content is distributed and displayed.

Many venues provide seating, which requires the selection of a seat location that has a particular line-of-sight to various displayed media content in the venue. The displayed media content can include sports, news, politics, pay per view events, and the like. When multiple types of media content are available, the venue must make determinations about how the media will be distributed and displayed, including, for example, whether to mute all of the displays, mute all but one display, have one selected display's corresponding audio played, and which media content to display on which devices.

SUMMARY

Embodiments of the present invention are directed to a computer-implemented method for selecting an optimal line-of-sight for a user in a multiple display screen venue. A non-limiting example of the computer-implemented method includes receiving, by a processor, an indication that the user is visiting the multiple display screen venue. A user profile including one or more preferences for the user is access based at least in part on the indication of the user. Properties for one or more locations in the venue are received and a set of locations from the one or more locations is determined that satisfy the one or more preferences of the user.

Embodiments of the present invention are directed to a computer-implemented method for distribution and display of media content in a venue. A non-limiting example of the computer-implemented method includes receiving, by a processor, sensor data including video of a first customer in a venue, wherein the venue includes a plurality of display screens. The first customer is identified based at least in part on the video data. One or more preferences of the customer are determined based at least in part on the identification of the customer. A preferred display screen is identified based at least in part on one or more location characteristics of the first customer and a first media content is displayed on the preferred display screen that satisfies the one or more preferences of the customer.

Embodiments of the present invention are directed to a system for selecting an optimal line-of-sight for a user in a multiple display screen venue. A non-limiting example of the system includes receiving, by a processor, an indication that the user is visiting the multiple display screen venue. A user profile including one or more preferences for the user is access based at least in part on the indication of the user. Properties for one or more locations in the venue are received and a set of locations from the one or more locations is determined that satisfy the one or more preferences of the user.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
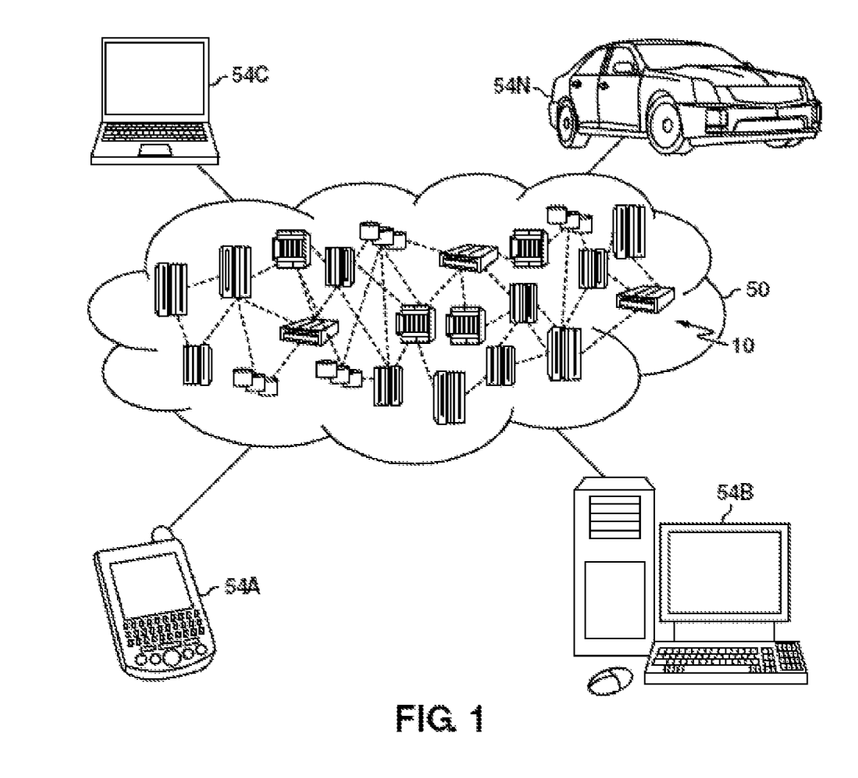
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
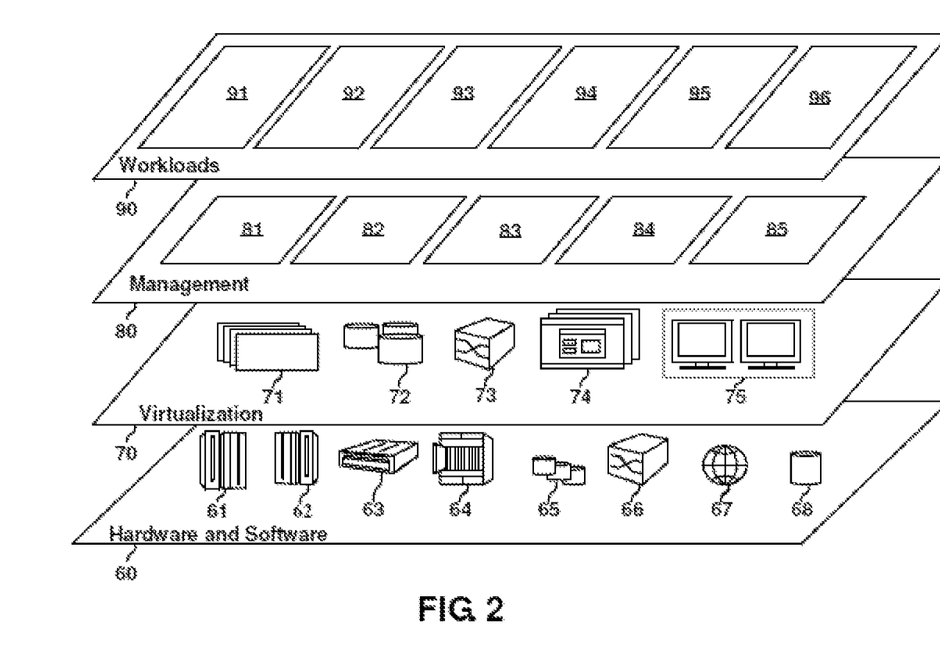
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recommending locations for a user in a multiple display screen venue 96.

Figure 3:
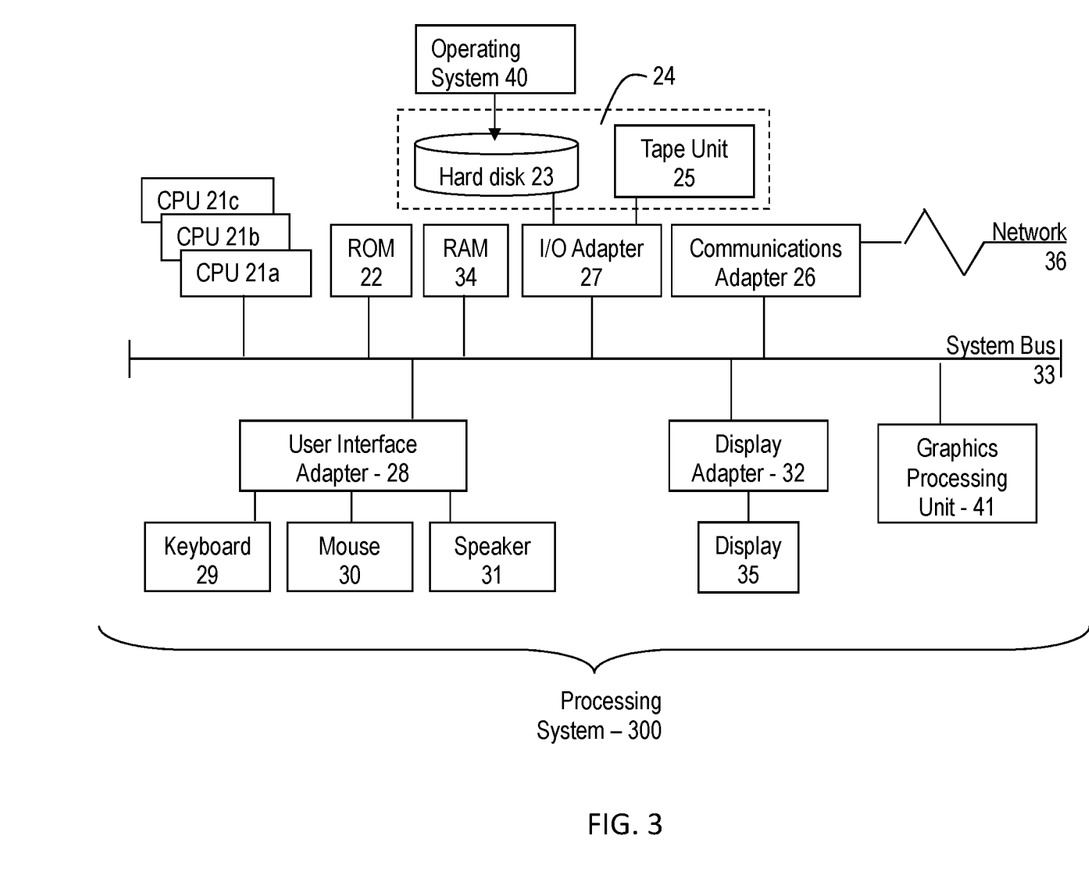
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Technologies that are more specifically relevant to aspects of the invention include methods and systems that utilize subjective determinations made by employees of a venue for preferred locations for customers in a multiple display venue. For example, in a restaurant venue, a host or hostess typically greets customers and asks the customers what preferences they have for seating in the restaurant. When the restaurant features multiple display screens for viewing sporting events or other events in the restaurant, the hostess will attempt to seat the customers in a location where the customers can view their preferred sporting event or television programming. A host or hostess will use their own subjective determination for a preferred location and not necessarily account for all the preferences of the customers to determine a preferred display screen and media content for the customers. Additionally, if the preferred media content changes for individual or multiple customers, employees of the venue are called upon to change the media content only after a customer has indicated that the preferred media content has changed. These methods and systems do not account optimal line-of-sight for a customer and accounting for changes in the customer's viewing preferences at the venue.

Multiple display screen venues include locations such as restaurants, airports, bus stations, and any other location where people tend to congregate. The display screens can be there to provide entertainment information, and/or advertisements to individuals at the venue. For example, a restaurant might include multiple display screens for sporting events to attract a crowd of customers to the restaurant while the sporting event is airing. However, given the multitude of sports teams and sporting events, it can be a challenge to determine what team or event to show on the restaurant's display screens at certain times. Additionally, for a diverse crowd, customers might require a wide range of sports programming to accommodate for the different preferences for these customers. A venue with multiple screens would benefit from knowing the customer preferences and being able to direct the customer to certain display screens to satisfy the customer's preferences. These systems and methods implemented at multiple display screen venues do not account for real-time changes in a customer's or crowd's focus on different display screens and do not capitalize on this real-time customer focus to modify the content being provided.

Turning now to an overview of the aspects of the invention, one or more embodiments of the invention address the above-described shortcomings of the prior art by providing methods and systems for selecting an optimal line-of-sight for a user in a multiple display screen venue and distribution and display of media content in a venue with multiple display screens. Aspects of the invention serve to optimize seating and standing locations within a venue to both improve customer access to media content on multiple display screens and to improve customer comfort when consuming the media content. Restaurants, airports, train stations, and other venues with multiple display screens work to generate and provide media that is best accessed by customers based at least in part on their location within a venue. For example, a restaurant will serve customers better by providing each customer with access to the media content of their choice when they are enjoying their food. This can be accomplished by analyzing the line-of-sight of every available viewing location within the venue and directing the customer to that location.

Aspects of the invention include receiving an indication that a user is visiting a multiple display screen venue. The indication can include a reservation on a smart phone application or facial recognition to identify the user at the venue. For example, a customer of a restaurant requests a reservation at the restaurant. The restaurant system recognizes the customer based on their reservation and accesses the customer's profile. The customer's profile includes the customer's preferences. The preferences include, for example, preferred media content, preferred seating type, a server preference, a location preference (e.g., bar area, booth, etc.), and the like. Based at least in part on the customer preferences, the restaurant system will identify a set of locations in the restaurant that satisfy the customer's preferences. This set of locations can be displayed to a host/hostess of the restaurant when the customer arrives to assist in directing the customer to one of the locations.

In some embodiments, a multiple display screen venue will best serve customers through the optimal distribution and display of media content throughout the venue. For example, in an airport venue, the media content can be a combination of the flight schedules along with some targeted advertisements such as, for example, a taxi service. A goal is to provide the best media content at an optimal time when there is a concentration of views on certain screens by individuals within the venue. An example method for determining optimal views would be through the use of cameras utilizing eye-tracking technologies to determine what particular screens are being viewed by individuals. Based at least in part on this eye-tracking, targeted media can be directed to the customer. The targeted media can be determined based at least in part on the focus of the customer and/or a profile determined by facial recognition of the customer. Additional data for the customer can be pulled from public sources such as, for example, social media profiles. In some embodiments, facial recognition can be utilized to determine an identity of a passenger of a flight or other type of trip and based on the identity, a database for flights or other travel can be access to determine a flight number or train number for example. Flight information, for example, can be displayed at or near the customer's location on a display screen based at least in part on the customer's travel plans.

In some embodiments, additional aspects of the invention include receiving sensor data associated with customers in a venue with multiple display screens. The sensor data can be video of the customer in the venue that helps to identify the customer using techniques such as, for example, facial recognition. Based at least in part on this identification, customer profiles are accessed to determine preferences for the customer. Preferences can include preferred media content. The venue system identifies what type of media content is being displayed on each display screen and determines preferred media content for the customer based at least in part on the customer profile. The venue system analyzes the location of the customer to determine a preferred display screen based on the characteristics of the location and then displays the preferred media content on the preferred display screen for the customer.

The above-described aspects of the invention address the shortcomings of the prior art by identifying a location in a multiple display venue that matches a customer's preferences and also monitors a venue with multiple customers to determine customer preferences for media content and displays the media content on display screens that are preferred based at least in part on the characteristics of the location of the customer.

Figure 4:
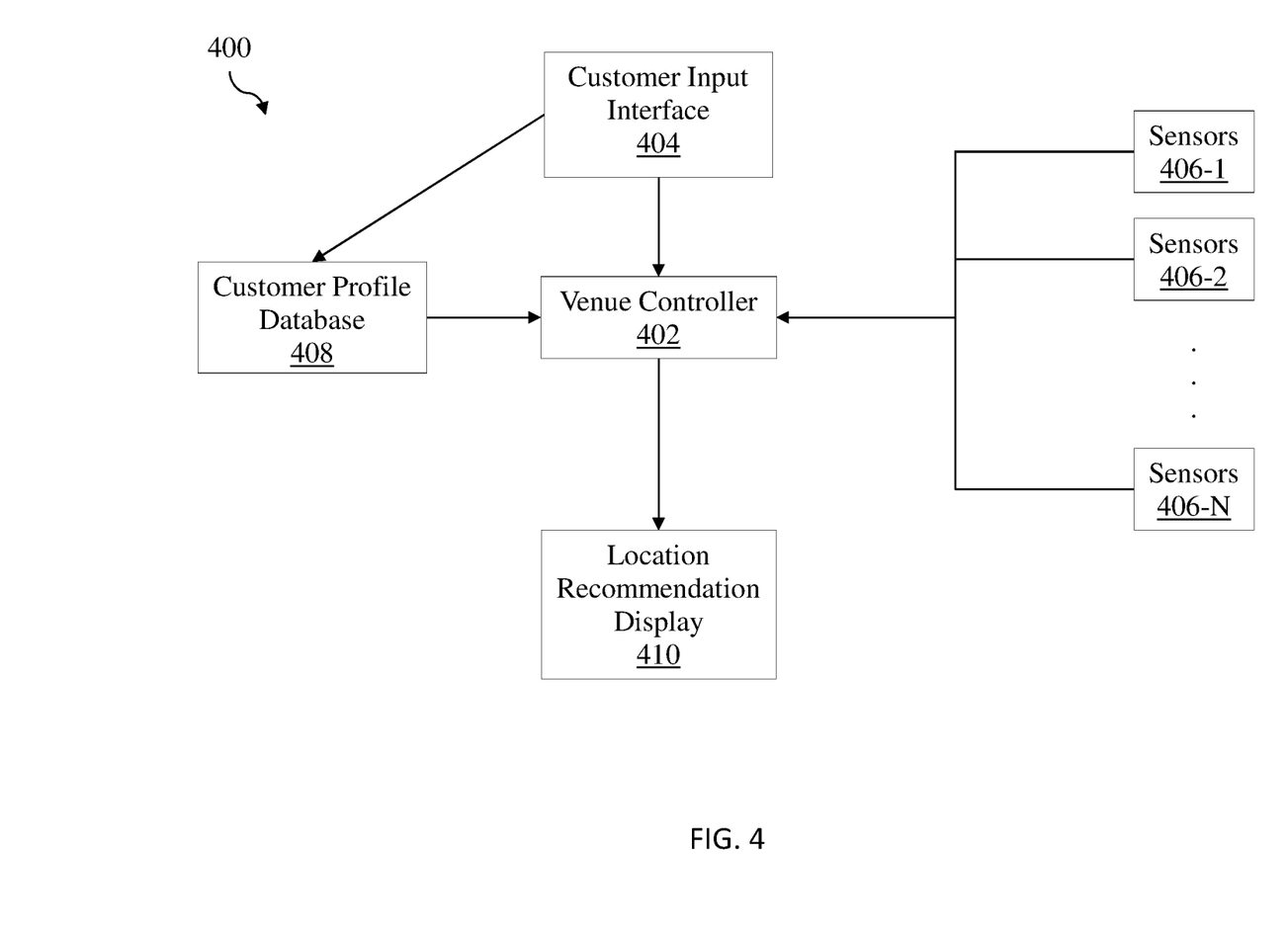
FIG. 4 depicts a block diagram of a system for recommending a location for a user in a multiple display screen venue and venue management according to one or more embodiments of the present invention.

Turning now to a more detailed description of aspects of the present invention, FIG. 4 depicts a system for recommending a location for a user in a multiple display screen venue and venue display management according to one or more embodiments of the present invention. The system 400 includes a venue controller 402, a customer input interface 404, a customer profile database 408, and a location recommendation display 410.

In one or more embodiments of the present invention, the system 400 can be implemented in a venue with multiple display screens and seating locations within the venue for a group of individuals. The group of individuals can be customers (also, referred to as users) of a certain venue. An example venue includes but is not limited to restaurants, airports, retail stores, and any venue with multiple display screens.

The system 400 also includes one or more sensors 406-1, 406-2 ... 406-N (wherein N=any whole number greater than 2) that are in electronic communication with the venue controller 402. The sensors 406-1, 406-2 ... 406-N can be any type of sensor such as a facial recognition camera, a key fob sensor, a credit card scanner and the like. The sensors 406-1, 406-2 ... 406-N are configured to collect sensor data on incoming or present customers in a venue. The sensor data can be video data that is analyzed using facial recognition techniques to help identify a customer.

In one or more embodiments of the invention, the venue controller 402 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In one or more embodiments of the invention, the venue controller 402 is configured to receive a customer input from a customer input interface 404. The customer input interface 404 can be an application on an electronic device that can receive reservations and/or notifications that a customer has arrived at the venue. The customer input interface 404 can also be a greeting location at the venue where an employee of the venue can receive an indication that a customer has arrived and enter the customer into the system 400. Other examples of the customer input interface 404 include but are not limited to a kiosk for a customer to enter their information and sensor devices such as a credit card scanner, or key fob scanner, and the like. In one or more embodiments of the invention, the sensors 406-1, 406-2, 406-N can include cameras with facial recognition capabilities that are configured to recognize a customer within the venue. Once recognized, the cameras can send the identity of the customer to the venue controller 402 to access the customer's profile.

In one or more embodiments of the invention, when a customer arrives at a venue, the venue controller 402 receives an indication that the customer has arrived. Based at least in part on the customer arriving, the venue controller 402 accesses the customer profile from the customer profile database 408. The customer profile (sometimes referred to as, "user profile") includes preferences of the customer as to what type of media content the customer prefers. These customer preferences include preferences for media content such as sporting events, television programming, news organizations, commentators for events, and the like. For example, a customer profile for a sports fan will include the customer's preferred sports team, preferred sports type, favorite athlete, favorite commentator, as well as other teams and sports the customer prefers. The customer profile also includes preferences for locations types with in the venue such as seating preferences, preferred areas in the venue, and the like. For example, for a restaurant venue, a customer profile includes preferences such as preferring a booth over a chair or bar stool. Also, the preferences include areas such as outdoor patio area or the bar area.

In one or more embodiments, based at least in part on the customer's profile, the venue controller 402 identifies locations within the venue that satisfy the customer's preferences. For example, a customer at a restaurant has preferences indicating a preference for a booth table that is in view of a local football team game. Based on these preferences, the venue controller 402 identifies one or more booth table seats that are oriented to view a display screen in the venue with the local football team game showing. The locations recommendation display 410 can display to an employee of the venue a list of locations that satisfy the customer's preferences so the employee can direct the customer to the available locations. Once a customer goes to the location, the location recommendation display 410 notifies the customer as to which display screen contains which of their preferred media content by location, by display screen number, or by the venue controller 402 sending a graphic to the customer's smart phone or other electronic device. This graphic can be incorporated into an application on the electronic device that displays within the application. The graphic can also be sent as an image by text message, email, or the like.

In one or more embodiments of the invention, the system 400 can be utilized for venue display management. The venue controller 402 receives sensor data from the sensors 406-1, 406-2, 406-N in the form of video data taken from cameras that are present in the venue and in electronic communication with the venue controller 402. Utilizing facial recognition, the venue controller 402 can identify the customers in the venue and access the customer profiles. Based at least in part on the location of the customers, the venue controller 402 can identify preferred display screens in the multiple display screen venue. These preferred display screens can display media content that satisfies preferences in the customer profiles.

In one or more embodiments, the identification of the customers by the cameras can be performed by analyzing social media data of the customers. For example, an image of a customer can be compared to a social media photo with the customer's name tagged to the photo. Also, the preferences of the customers can be determined by the information obtained from the customer's social media data. For example, a customer in a restaurant is seated in view of a preferred display screen (e.g., television). The preferred display screen is playing highlights of the previous day baseball games. According to the social media data for the customer, the customer is a fan of tennis. The venue controller 402 would analyze a programming schedule to determine if there are any tennis matches or tournaments available to display. If so, the preferred display screen would automatically change to the tennis match for the customer.

In one or more embodiments, the venue controller 402 can be a graphic user interface (GUI) that displays the location of each display screen and viewing location along with the media content being displayed as well as potential current and future media content available for display. The venue controller 402 can be modified by a user, such as a manager, hostess, and/or wait staff member, to adjust for changes in the customers or changes in an interest and/or excitement level within the venue. For example, in a restaurant, a manager can determine that a sporting event has gone into overtime and it has generated a lot of interest by the patrons of the restaurant. The manager can look to the venue controller 402 to allocate a better viewing experience to the customers by changing multiple display screens so that the majority of the customers have access to the particular sporting event. This can be done while maintaining display screen viewings by customers who are not interested in the overtime sporting event.

Figure 5:
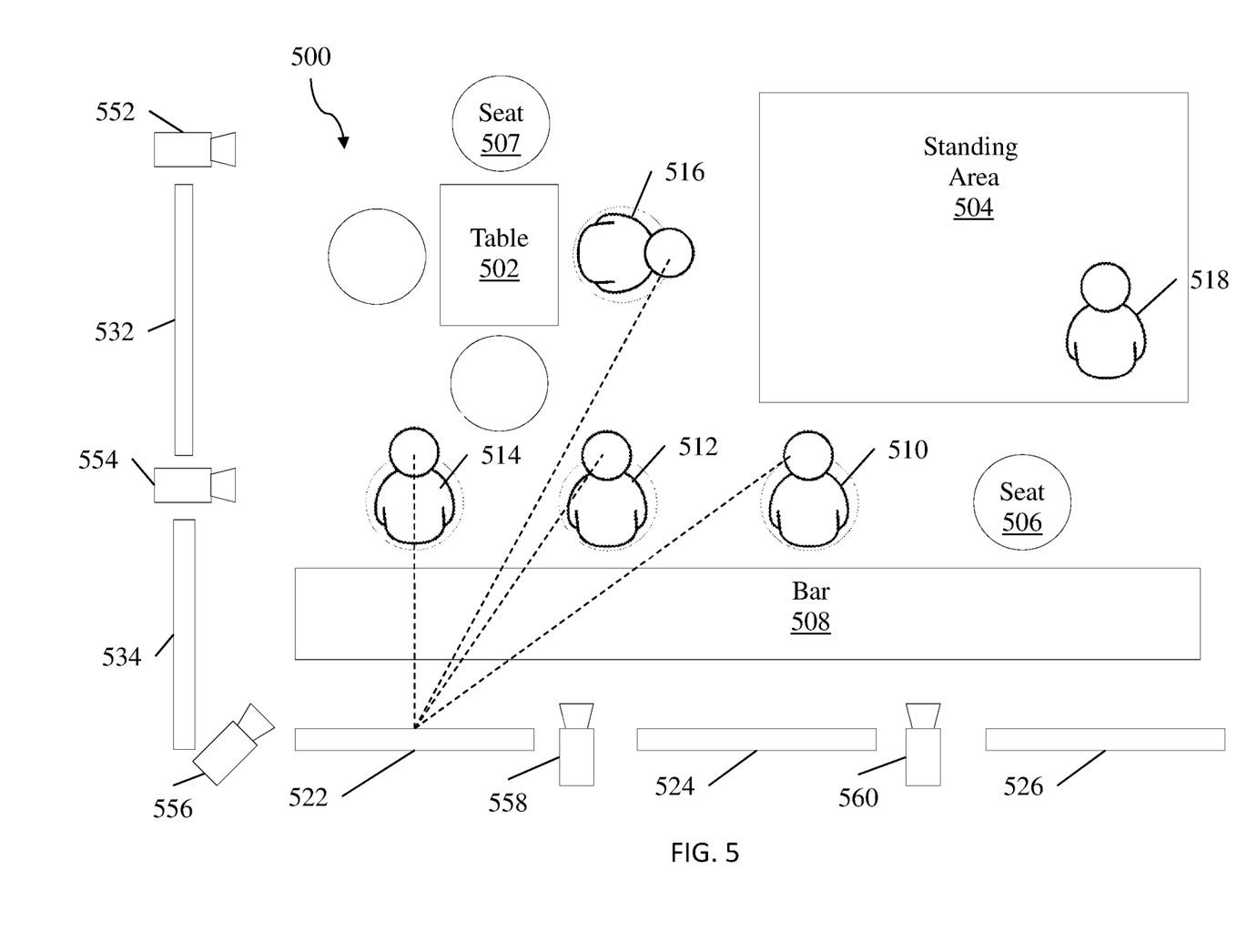
FIG. 5 depicts an illustrative example of a multiple display venue utilizing a venue display management system according to one or more embodiments of the invention.

FIG. 5 depicts an illustrative example of a multiple display venue utilizing a venue display management system according to one or more embodiments of the invention. The multiple display venue 500 can utilize the system 400 described herein for recommending a location for a user and management of the venue display screens. For example, a standing user 518 can indicate that he is looking for a location within the venue to watch a sporting event. As mentioned above, the indication can include an input on an application on a smart phone or simply talking to an employee of the venue and identifying themselves. The standing user 518 has a profile that the venue controller 402 can access to find what display is showing the sporting event the user prefers. If display screen 526 is showing the sporting event, the standing user 518 can be directed to seat 506 at the bar 508 because the seat 506 is available and it has an orientation that satisfies the standing user's 518 preferences as indicated in the profile of the standing user 518.

In one or more embodiments, the multiple display venue 500 can have multiple cameras (552, 554, 556, 558, 560) set up within the venue 500. The multiple display venue 500 can also have multiple display screens (522, 524, 526, 532, 534) set up in venue 500. Initially, the venue controller 402 can set up the display screens to show media content uniformly around the venue 500. Four customers (510, 512, 514, and 516) enter the venue 500 and take up seating at various locations. The cameras can record video data of the customers (510, 512, 514, and 516) to determine where each customer is focusing their attention. Eye tracking can be utilized to determine the focal point of each customer. In the illustrative example, each customer (510, 512, 514, and 516) is focused on display screen 522. The venue controller 402 can analyze the media content being shown on display screen 522. Based at least in part on the focus of the customers, the preferred media content of the customers can be determined to be the media content shown on display screen 522. The venue controller 402 can then analyze the location of the customers and identify preferred display screens based at least in part on the customers' locations around the venue 500. For example, customer 510 is sitting across from display screen 524. The venue controller 402 can then display the media content from display screen 522 on display screen 524 also. Additionally, based on the location of customer 516 at table 502, display screen 532 is determined to be a preferred display screen. The media content for display screen 522 can be displayed on display screen 532 to accommodate customer 516. A preferred display screen is determined based at least in part on size, orientation, viewing angle, and the like. Certain characteristics of the display screen can take priority over other characteristics. For example, a viewing angle as it relates to seating locations can take priority over the size of the display screen and vice versa. The venue controller 402 looks to minimize customers having to change their seating position or orientation to look at a display screen.

In one or more embodiments, a threshold time period is defined in the venue controller 402. For the display screens around a customer to change, eye tracking of the customer would need to establish a focus of the customer for a period of time longer than the threshold time period. For example, if several customers are focusing on one screen for longer than a minute, the venue controller 402 would look to change the display screens for the customers. The focal point of each customer can be determined utilizing eye tracking by the cameras around the venue 500.

In one or more embodiments, the venue 500 cameras (552, 554, 556, 558, 560) can record video data of the customers and the venue controller 402 can analyze the accompaniments of the customers. Accompaniments include any companions of the customer such as family members, friends, service animals, and the like. Additionally, an accompaniment includes any clothing or items brought in by the customer such as a sweatshirt indicating an affiliation with a sports club and/or athlete. Based at least in part on the accompaniments of the customer, preferred media content can be determined and shown on a display screen that is preferred by the customer. For example, a customer enters the venue 500 and the cameras determine that the customer is wearing a hat featuring a sports club. The venue controller 402 can analyze the available media content to determine if the sports club is playing in any games at that time and display the games on a preferred display screen for the customer.

In one or more embodiments of the invention, the video data taken from the cameras can be utilized to determine information about the customers such as, for example, how much time the customer is looking at the media content, the customer's level of distraction, the ratio of time the customer is looking at the display screen and other items such as food items or looking at other individuals accompanying the customer.

In one or more embodiments of the invention, the venue 500 can be a location such as an airport where multiple customers are waiting for an arrival or departure. The display screens can be set up at different locations within the waiting area. Cameras can also be set up around the location to record video data. Utilizing eye tracking from the video data, the venue controller 402 can determine what types of media content draws the attention of the customers. For example, if a particular advertisement is shown on a display screen and the video data shows the focus a group of customers that changes to the display screen, the advertising company that created the advertisement can determine the advertisement is effective for drawing attention to the advertisement. In the airport example, facial recognition can be utilized by cameras located within the venue to determine a customer identity. The customer identity can be matched and/or verified utilizing a saved profile of the customer or a social media public profile of the customer. The saved profile of the customer can be created for the system 400 and stored in the customer profile database 408 for the airport. Based on the identity of the customer, an itinerary can be accessed by the venue controller 402 to determine flight information of the customer. The flight information can then be displayed on a display screen near or in an optimal line-of-sight for the customer so that the customer can be updated on the flight information. Other information can be displayed on the display screen such as the local weather of the flight destination and/or attractions and other advertisements target to the customer based at least in part on the destination and the customer profile.

Figure 6:
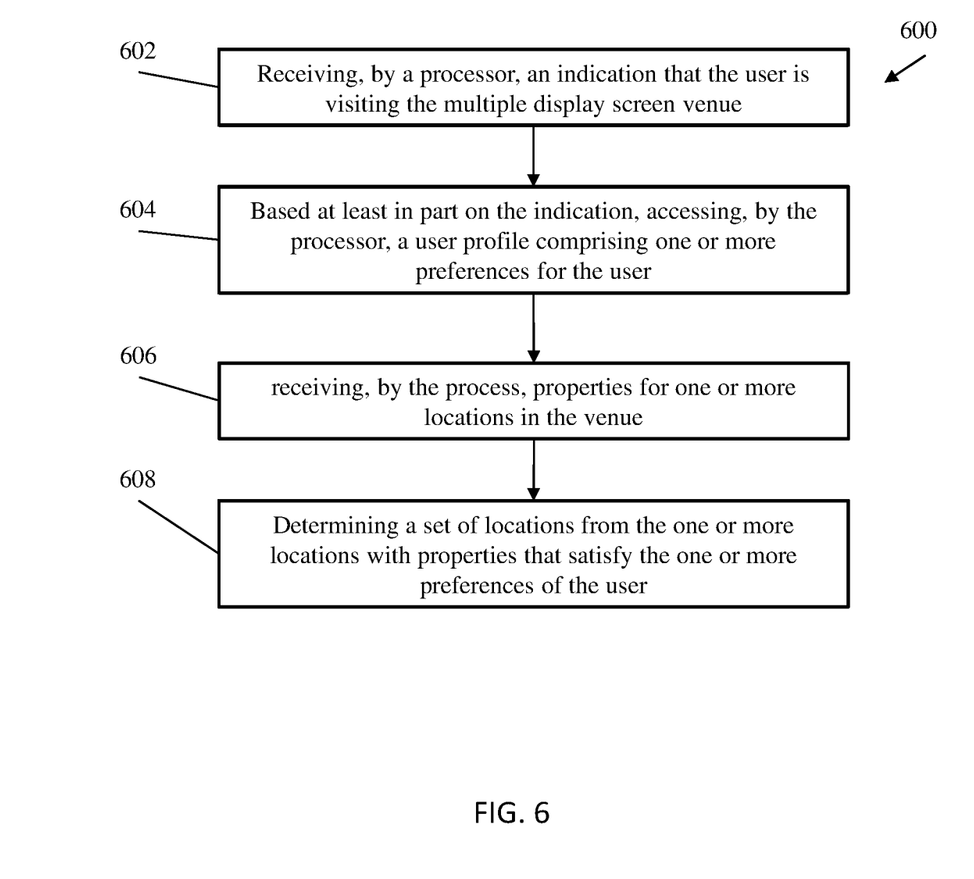
FIG. 6 depicts a flow diagram of a method for recommending a location for a user in a multiple display screen venue according to one or more embodiments of the invention.

FIG. 6 depicts a flow diagram of a method for recommending a location for a user in a multiple display screen venue according to one or more embodiments of the invention. The method 600 includes receiving, by a processor, an indication that the user is visiting the multiple display screen venue, as shown at block 602. At block 604, the method 600 based at least in part on the indication, includes accessing, by the processor, a user profile comprising one or more preferences for the user. The method 600 includes receiving, by the process, properties for one or more locations in the venue, as shown at block 606. At block 608, the method includes determining a set of locations from the one or more locations with properties that satisfy the one or more preferences of the user.

Additional processes may also be included. It should be understood that the processes depicted in FIG. 6 represent illustrations, and that other processes may be added or existing processes may be removed, modified, or rearranged without departing from the scope and spirit of the present disclosure.

Figure 7:
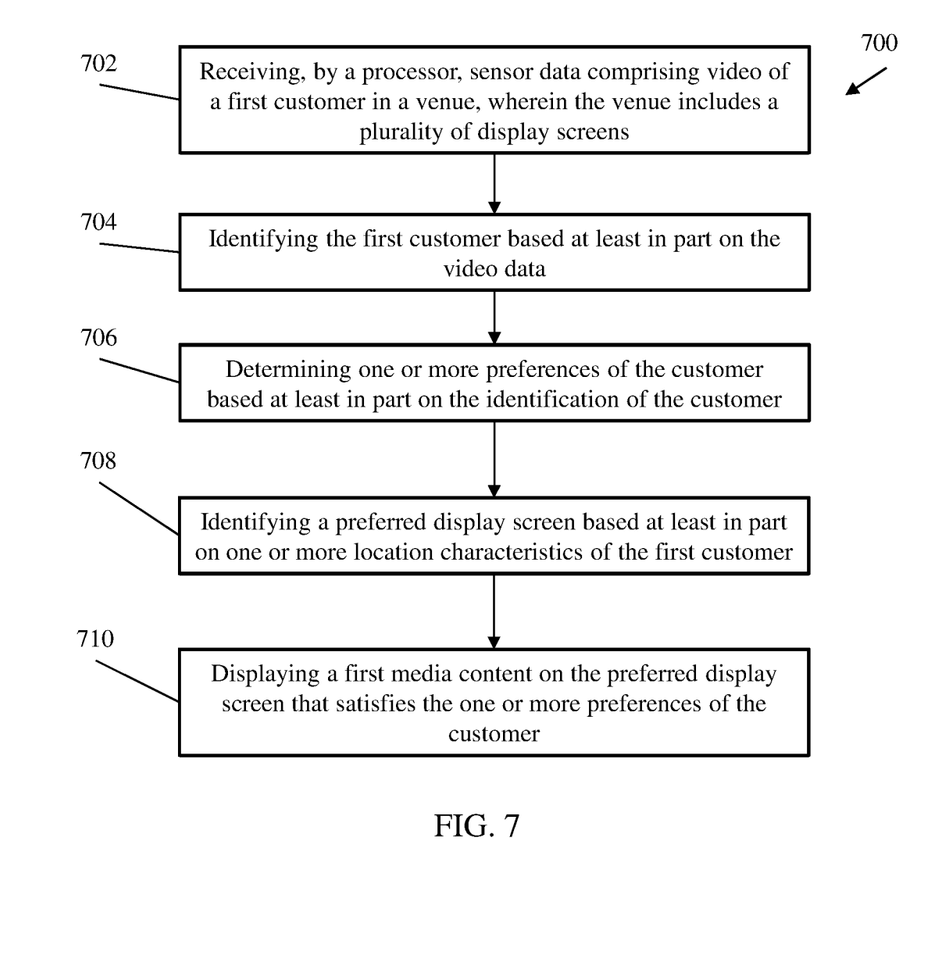
FIG. 7 depicts a flow diagram of a method for venue display management according to one or more embodiments of the invention.

FIG. 7 depicts a flow diagram of a method for venue display management according to one or more embodiments of the invention. The method 700 includes receiving, by a processor, sensor data comprising video of a first customer in a venue, wherein the venue includes a plurality of display screens, as shown at block 702. At block 704, the method 700 includes identifying the first customer based at least in part on the video data. The method 700, at block 706, includes determining one or more preferences of the customer based at least in part on the identification of the customer. At block 708, the method 700 includes identifying a preferred display screen based at least in part on one or more location characteristics of the first customer. The method 700 also includes displaying a first media content on the preferred display screen that satisfies the one or more preferences of the customer, as shown at block 710.

Additional processes may also be included. It should be understood that the processes depicted in FIG. 7 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for distribution and display of media content in a venue, the method comprising:
   receiving, by a processor, sensor data comprising video data of a first customer in a venue, wherein the venue includes a plurality of display screens, and wherein the venue has a program schedule including media content and a time period for displaying the media content for each display screen in the plurality of display screens;
   identifying the first customer based at least in part on the video data;
   accessing a customer profile for the first customer responsive to identifying the first customer;
   identifying accompaniments of the first customer based on the video data, wherein the accompaniments comprise at least one article of clothing of the first customer;
   determining one or more preferences of the first customer based at least in part on the customer profile and the article of clothing of the first customer, wherein the customer profile comprises a seating preference for the first customer;
   identifying a preferred display screen based at least in part on one or more location characteristics of the first customer, wherein the one or more location characteristics comprise a line-of-sight of the first customer with respect to each display screen in the plurality of display screens;
   transmitting an image of the preferred display screen to a user device associated with the first customer;
   determining a first media content for the first customer based on analyzing the article of clothing of the first customer to determine an affiliation with the first media content associated with the article of clothing, wherein the first media content is selected from the program schedule;
   displaying the first media content on the preferred display screen;
   monitoring, by a sensor, eye movement of the first customer to determine a focus location of the first customer;
   comparing the focus location of the first customer with a location of the preferred display screen;
   based at least in part on the focus location of the first customer being different from the location of the preferred display screen for a time period longer than a threshold time period, identifying a focus display screen from the plurality of display screens within the focus location of the first customer;
   determining a second media content on the focus display screen;
   displaying the second media content on the preferred display screen; and
   receiving, by the processor, a venue controller override input from an operator at the venue and responsively displaying a third media content on the preferred display screen and on other multiple display screens based on the venue controller override input and based on excitement level of customers within the venue, wherein the operator is different from the first customer.

2. The method of claim 1, wherein the determining one or more preference for media content for the first customer further comprises analyzing social media of the first customer.

3. The method of claim 1, wherein the determining one or more preference for media content for the first customer further comprises analyzing the customer profile of the first customer.

4. The method of claim 1, wherein the monitoring eye movement of the first customer comprises a time delay period for determine the focus location of the first customer.

5. A system for distribution and display of media content in a venue, the system comprising:
   a processor communicative coupled to a memory, the processor configured to:
   receive sensor data comprising video data of a first customer in a venue, wherein the venue includes a plurality of display screens, and wherein the venue has a program schedule including media content and a time period for displaying the media content for each display screen in the plurality of display screens;
   identify the first customer based at least in part on the video data;
   access a customer profile for the first customer responsive to identifying the first customer;
   identify accompaniments of the first customer based on the video data, wherein the accompaniments comprise at least one article of clothing of the first customer;
   determine one or more preferences of the first customer based at least in part on the customer profile and the article of clothing of the first customer, wherein the customer profile comprises a seating preference for the first customer;
   identify a preferred display screen based at least in part on one or more location characteristics of the first customer, wherein the one or more location characteristics comprise a line-of-sight of the first customer with respect to each display screen in the plurality of display screens;
   transmit an image of the preferred display screen to a user device associated with the first customer;
   determine a first media content for the first customer based on analyzing the article of clothing of the first customer to determine an affiliation with the first media content associated with the article of clothing, wherein the first media content is selected from the program schedule;

display the first media content on the preferred display screen;

monitor, by operating a sensor, eye movement of the first customer to determine a focus location of the first customer;

compare the focus location of the first customer with a location of the preferred display screen;

based at least in part on the focus location of the first customer being different from the location of the preferred display screen for a time period longer than a threshold time period, identify a focus display screen from the plurality of display screens within the focus location of the first customer;

determine a second media content on the focus display screen;

display the second media content on the preferred display screen; and receive a venue controller override input from an operator at the venue and responsively displaying a third media content on the preferred display screen and on other multiple display screens based on the venue controller override input and based on excitement level of customers within the venue, wherein the operator is different from the first customer.

6. The system of claim 5, wherein the determining one or more preference for media content for the first customer further comprises analyzing social media of the first customer.

7. The system of claim 5, wherein the determining one or more preference for media content for the first customer further comprises analyzing the customer profile of the first customer.

8. The system of claim 5, wherein the monitoring eye movement of the first customer comprises a time delay period for determine the focus location of the first customer.

9. A computer program product for distribution and display of media content in a venue, the computer program product comprising:

a non-transitory computer readable medium readable by a processor and storing instructions for execution by the processor to perform a method comprising:

receiving, by the processor, sensor data comprising video data of a first customer in a venue, wherein the venue includes a plurality of display screens, and wherein the venue has a program schedule including media content and a time period for displaying the media content for each display screen in the plurality of display screens;

identifying the first customer based at least in part on the video data;

accessing a customer profile for the first customer responsive to identifying the first customer;

identifying accompaniments of the first customer based on the video data, wherein the accompaniments comprise at least one article of clothing of the first customer;

determining one or more preferences of the first customer based at least in part on the customer profile and the article of clothing of the first customer, wherein the customer profile comprises a seating preference for the first customer;

identifying a preferred display screen based at least in part on one or more location characteristics of the first customer, wherein the one or more location characteristics comprise a line-of-sight of the first customer with respect to each display screen in the plurality of display screens;

transmitting an image of the preferred display screen to a user device associated with the first customer;

determining a first media content for the first customer based on analyzing the article of clothing of the first customer to determine an affiliation with the first media content associated with the article of clothing, wherein the first media content is selected from the program schedule;

displaying the first media content on the preferred display screen;

monitoring, by a sensor, eye movement of the first customer to determine a focus location of the first customer;

comparing the focus location of the first customer with a location of the preferred display screen;

based at least in part on the focus location of the first customer being different from the location of the preferred display screen for a time period longer than a threshold time period, identifying a focus display screen from the plurality of display screens within the focus location of the first customer;

determining a second media content on the focus display screen;

displaying the second media content on the preferred display screen; and receiving, by the processor, a venue controller override input from an operator at the venue and responsively displaying a third media content on the preferred display screen and on other multiple display screens based on the venue controller override input and based on excitement level of customers within the venue, wherein the operator is different from the first customer.

10. The computer program product of claim 9, wherein the determining one or more preference for media content for the first customer further comprises analyzing social media of the first customer.

11. The computer program product of claim 9, wherein the determining one or more preference for media content for the first customer further comprises analyzing the customer profile of the first customer.

12. The computer program product of claim 9, wherein the monitoring eye movement of the first customer comprises a time delay period for determine the focus location of the first customer.

* * * * *